(12) United States Patent
Harris et al.

(10) Patent No.: US 9,719,221 B2
(45) Date of Patent: Aug. 1, 2017

(54) VEHICLE SAFETY CATCH FENCE

(71) Applicant: SPEEDWAY MOTORSPORTS, INC., Charlotte, NC (US)

(72) Inventors: James Wesley Harris, Charlotte, NC (US); Stephen Dail Swift, Sparta, KY (US)

(73) Assignee: SPEEDWAY MOTORSPORTS, INC., Charlotte, NC (US)

( * ) Notice: Subject to any disclaimer, the term of this patent is extended or adjusted under 35 U.S.C. 154(b) by 0 days.

(21) Appl. No.: 14/251,172

(22) Filed: Apr. 11, 2014

(65) Prior Publication Data

US 2014/0312289 A1 Oct. 23, 2014

Related U.S. Application Data

(60) Provisional application No. 61/813,521, filed on Apr. 18, 2013, provisional application No. 61/865,032, filed on Aug. 12, 2013.

(51) Int. Cl.
*E01F 15/06* (2006.01)
*E01F 15/02* (2006.01)

(52) U.S. Cl.
CPC ............ *E01F 15/06* (2013.01); *E01F 15/025* (2013.01); *Y10T 29/49826* (2015.01)

(58) Field of Classification Search
CPC .......... E01F 15/06; E01F 13/02; E04H 17/02; E04H 17/04; E04H 17/06; E04H 17/08; F16G 11/06
See application file for complete search history.

(56) References Cited

U.S. PATENT DOCUMENTS

| | | | | |
|---|---|---|---|---|
| 411,995 A * | 10/1889 | Mast | ................ | 256/37 |
| 522,575 A * | 7/1894 | Allenson | ................ | 403/396 |
| 566,474 A * | 8/1896 | Russell | ................ | 256/45 |
| 841,165 A * | 1/1907 | Meech | ................ | 403/396 |
| 1,245,197 A * | 11/1917 | Crosby | ................ | 403/394 |
| 1,666,885 A * | 4/1928 | Austin | ................ | 24/135 L |
| 1,759,794 A * | 5/1930 | McDade | ................ | 248/66 |
| 2,009,364 A * | 7/1935 | Tufts | ................ | 256/13.1 |
| 2,179,516 A * | 11/1939 | Patrick | ................ | 403/394 |
| 2,321,988 A * | 6/1943 | Brickman | ................ | 256/13.1 |
| 2,883,159 A * | 4/1959 | Esmay | ................ | 256/1 |
| 3,608,034 A * | 9/1971 | Bramley et al. | ................ | 264/145 |
| RE27,544 E * | 1/1973 | Bramley et al. | ................ | 428/107 |
| 3,723,036 A * | 3/1973 | Maguire et al. | ................ | 425/129.1 |
| 4,475,843 A * | 10/1984 | Wyler | ................ | 403/394 |
| 4,501,411 A * | 2/1985 | Otaki | ................ | 256/13.1 |
| 5,752,860 A * | 5/1998 | Greaves | ................ | H01R 4/44 439/100 |
| 8,864,502 B2 * | 10/2014 | Dinh | ................ | 439/97 |
| 2003/0016996 A1 * | 1/2003 | Gelfand et al. | ................ | 404/6 |

* cited by examiner

*Primary Examiner* — Jonathan Masinick
(74) *Attorney, Agent, or Firm* — Moore & Van Allen PLLC; Jeffrey R. Gray

(57) ABSTRACT

The present invention is directed to a vehicle safety catch fence system, the system comprising: two or more posts; two or more longitudinal cables operatively coupled between the two or more posts; a transverse cable, wherein the transverse cable is operatively coupled to the two or more longitudinal cables; and two or more cable clamps, wherein the two or more cable clamps operatively couple the transverse cable to the two or more longitudinal cables.

9 Claims, 16 Drawing Sheets

VEHICLE SAFETY CATCH FENCE

CROSS REFERENCES TO OTHER RELATED APPLICATIONS

This application claims priority from and is a non-provisional patent application of U.S. Provisional Patent Application No. 61/813,521, filed on Apr. 18, 2013, and entitled "Vehicle Safety Catch Fence" and U.S. Provisional Patent Application No. 61/865,032, filed on Aug. 12, 2013, and entitled "Vehicle Safety Catch Fence," the contents of which are hereby incorporated by reference in their entirety.

FIELD

In general, embodiments herein disclosed relate to systems and methods for safely dissipating loads when a vehicle is involved in a collision with a fence or guardrail. More specifically, the systems and methods reduce the chance of injury to drivers and spectators, and reduce the damage to the vehicles and other property by utilizing the improved fence system. The embodiments of the present invention are particularly applicable for use on race tracks.

BACKGROUND

When a car collides with a wall or fence (e.g., when a racecar collides with a wall or fence on a track), there is a need to redistribute the impact forces in an efficient and safe manner.

BRIEF SUMMARY

Embodiments of the invention comprise a vehicle safety catch fence system. The purpose of the safety catch fence system is to provide a safety barrier between the road way and the surrounding area (e.g., create a barrier between a race track and as a grandstand of spectators). In the event of a racecar's collision with a catch fence, the catch fence may stop the car and associated debris from entering the surrounding area and potentially harming spectators, equipment, or the like.

In one aspect, the present invention is directed to a vehicle safety catch fence system, the system comprising: two or more posts; two or more longitudinal cables operatively coupled between the two or more posts; a transverse cable, wherein the transverse cable is operatively coupled to the two or more longitudinal cables; and two or more cable clamps, wherein the two or more cable clamps operatively couple the transverse cable to the two or more longitudinal cables.

In some embodiments, each of the two or more cable clamps comprise: a first plate; a second plate operatively coupled to the first plate; and wherein each of the two or more cable clamps operatively coupled the transverse cable to the two or more longitudinal cables.

In some embodiments, the first plate or the second plate comprises: a ridge located on an inner surface of the first plate or the second plate that conforms to a cable surface of the transverse cable or the two or more longitudinal cables.

In some embodiments, the first plate and the second are operatively coupled through one or more bolts.

In some embodiments, the transverse cable is operatively coupled to the two or more longitudinal cables in a substantially parallel orientation.

In some embodiments, the transverse cable is operatively coupled to the two or more longitudinal cables in an angled orientation, wherein a first section of the transverse cable is operatively coupled to a first longitudinal cable at a first location closer to a first post than a second post, and a second section of the transverse cable is operatively coupled to a second longitudinal cable above the first longitudinal cable at a second location closer to the second post than the first post.

In some embodiments, the transverse cable comprises a first end that is operatively coupled to a ground or a wall located below the two or more longitudinal cables.

In some embodiments, the transverse cable is operatively coupled to the wall through an aperture in the wall and epoxy.

In some embodiments, the system further comprises: a plurality of offset brackets operatively coupled to the two or more posts; a plurality of cable support seats each operatively coupled to each of the plurality of offset brackets; wherein each of the plurality of offset brackets and the plurality of cable support seats support each of the two or more longitudinal cables between the two or more posts at an offset distance located away from a surface of the two or more posts.

In some embodiments, the plurality of offset brackets each comprise: a first bracket operatively coupled to each of the two or more posts; a second bracket operatively coupled to the first bracket; wherein the second bracket is offset from the two or more posts; and wherein the second bracket may be removed from the first bracket for replacement.

In some embodiments, the plurality of offset brackets each comprise; an aperture therethrough; wherein the plurality of cable support seats are each operatively coupled to an inner surface of each of the plurality of offset brackets; wherein each of the two or more longitudinal cables are located within the aperture of each of the plurality of offset brackets and secured within each of the plurality of cable support seats, such that each of the two or more longitudinal cables are located between an outer surface of each of the plurality of offset brackets and the two or more posts.

In some embodiments, the system further comprises: a wire mesh screen; wherein the two or more posts comprises a first side and a second side; and wherein the two or more longitudinal cables are located on the first side and the wire mesh screen is located on the second side.

BRIEF DESCRIPTION OF THE DRAWINGS

Figure 1:
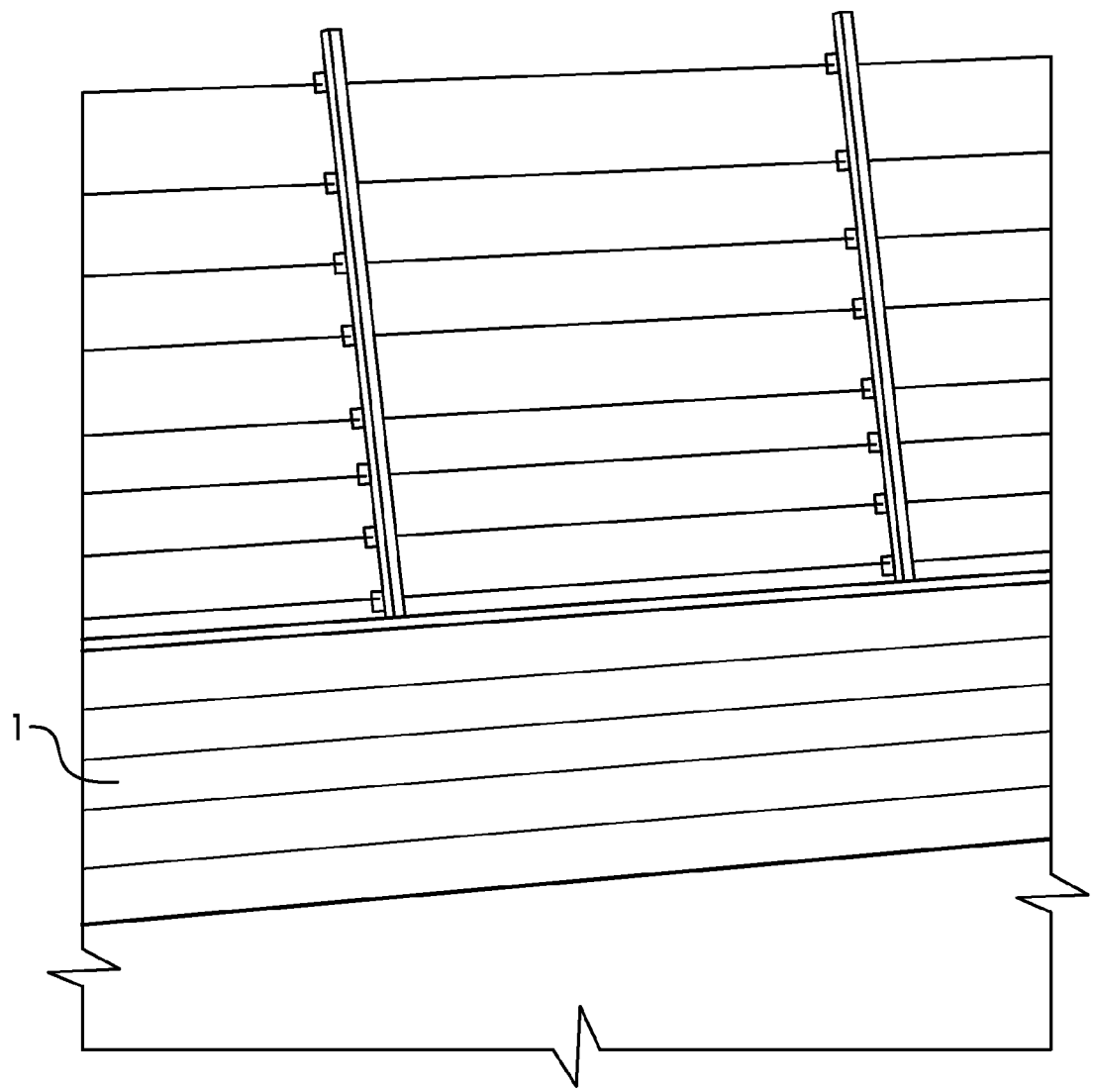
Figure 2A:
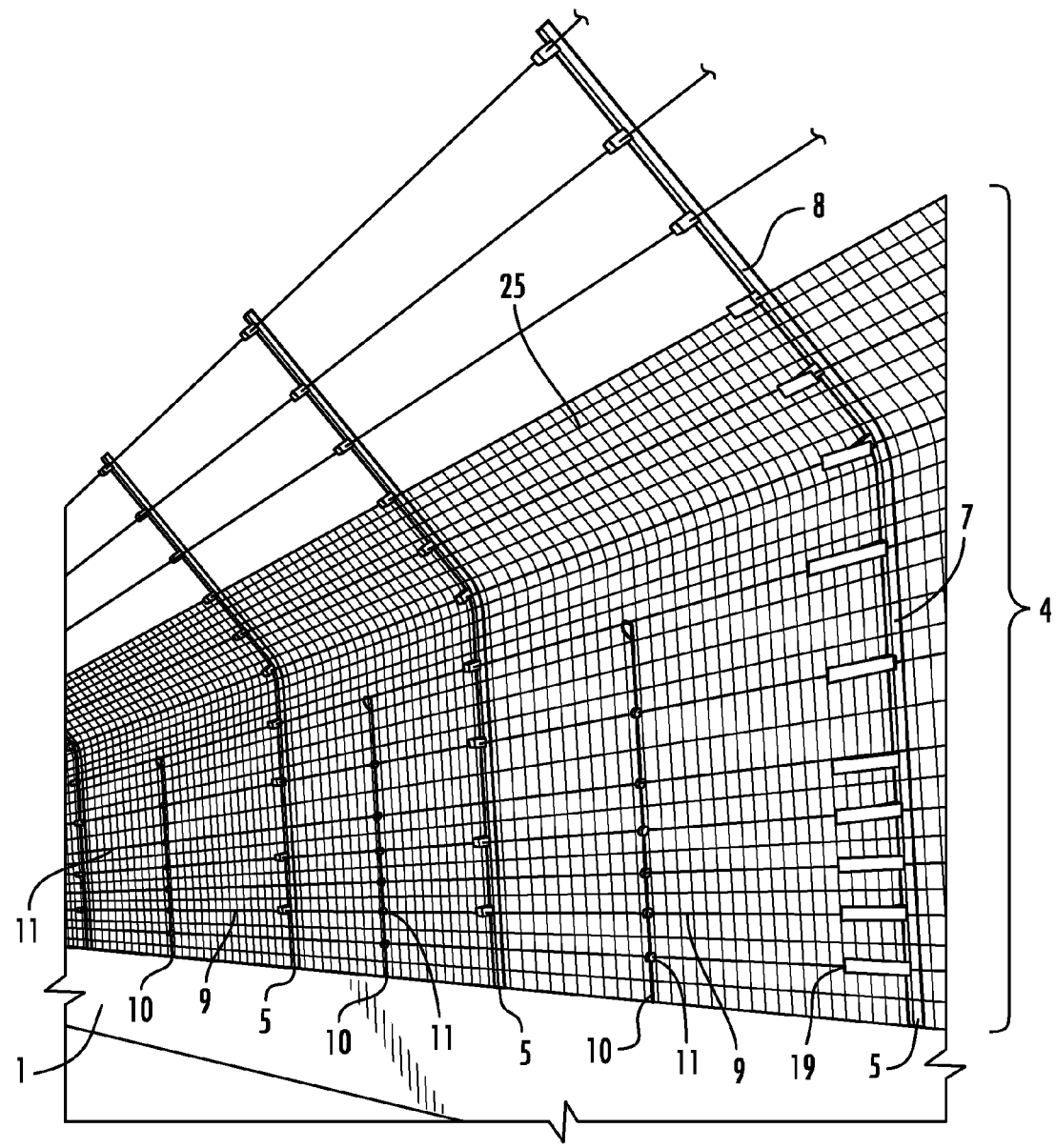
Figure 2B:
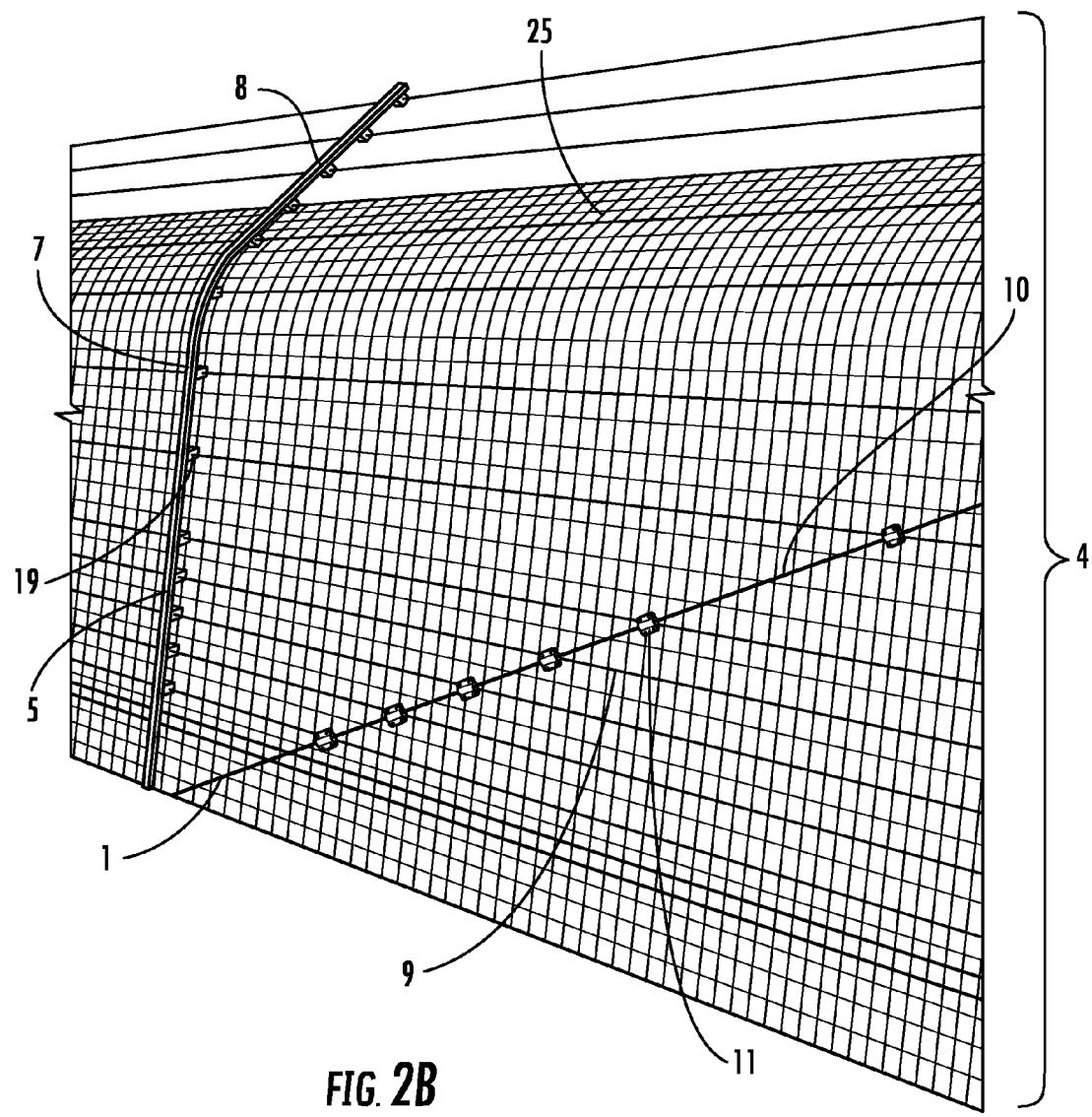
Figure 2C:
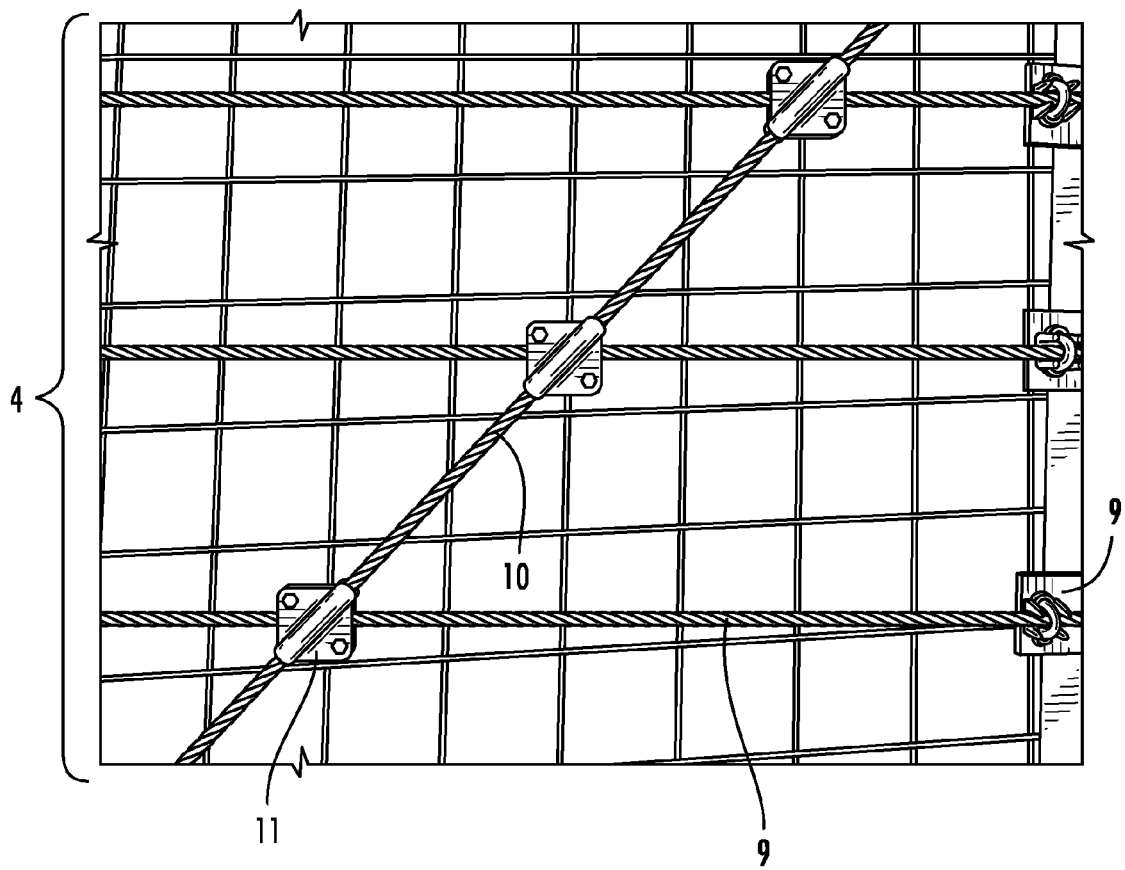
Figure 3:
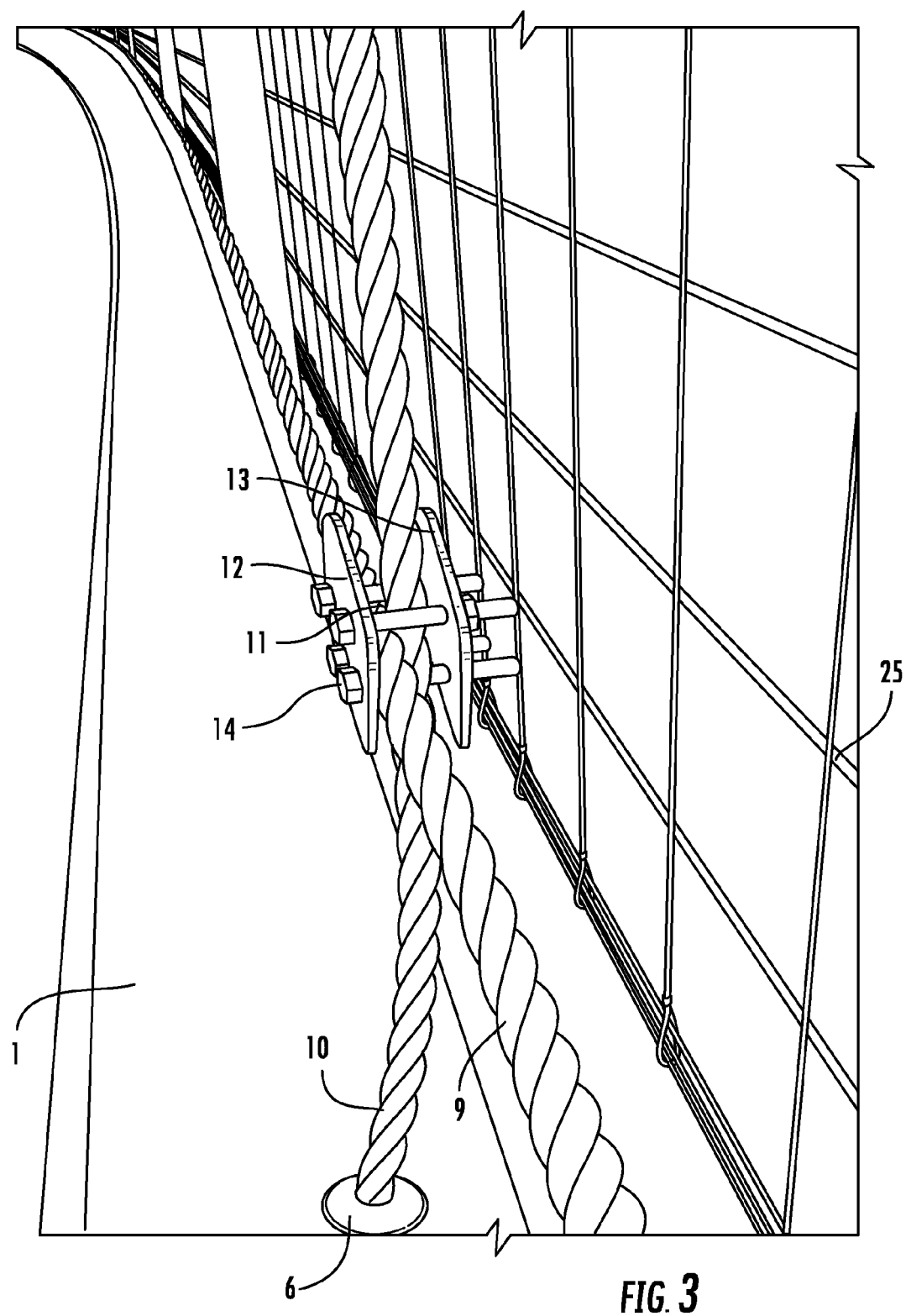
Figure 4:
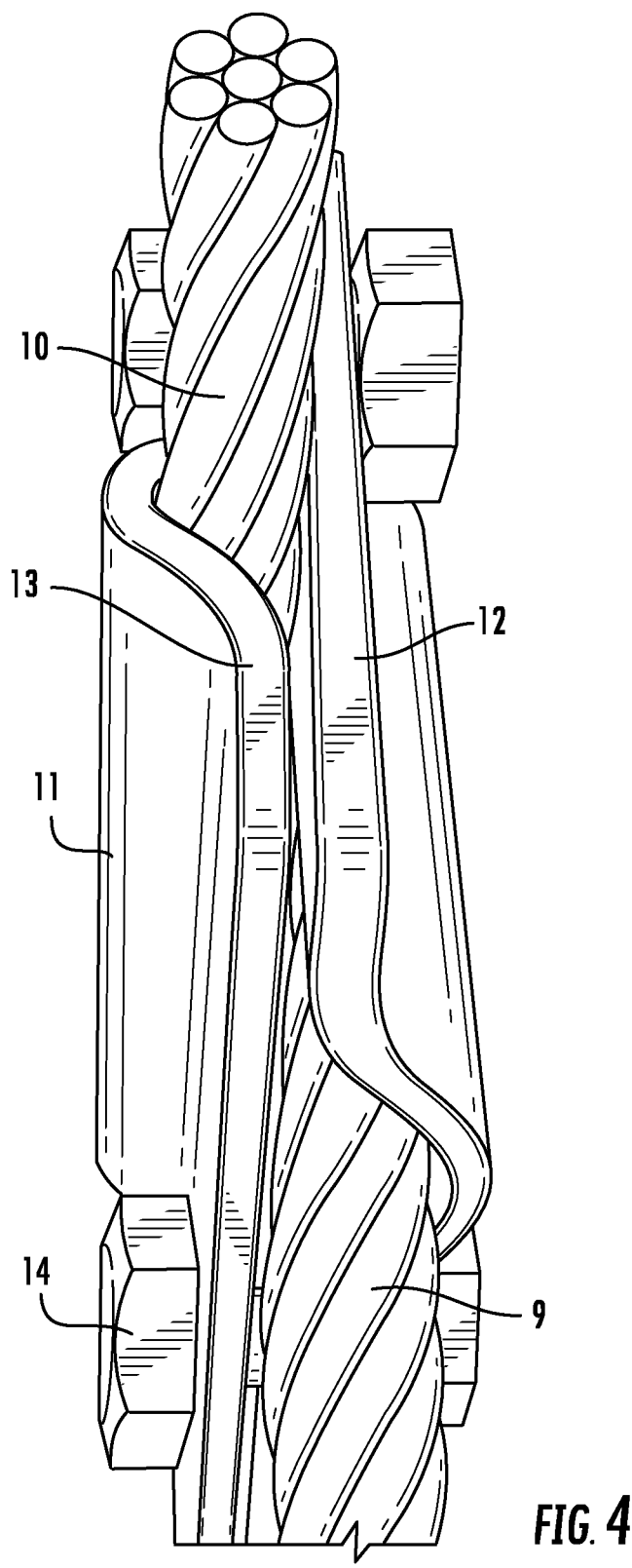
Figure 5A:
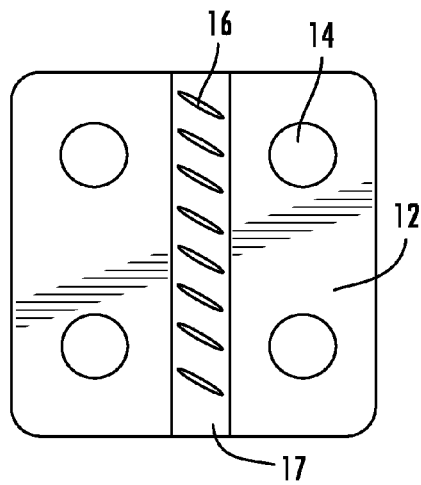
Figure 5B:
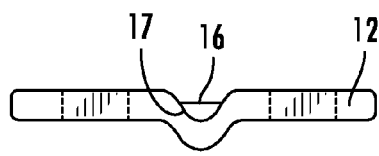
Figure 6A:
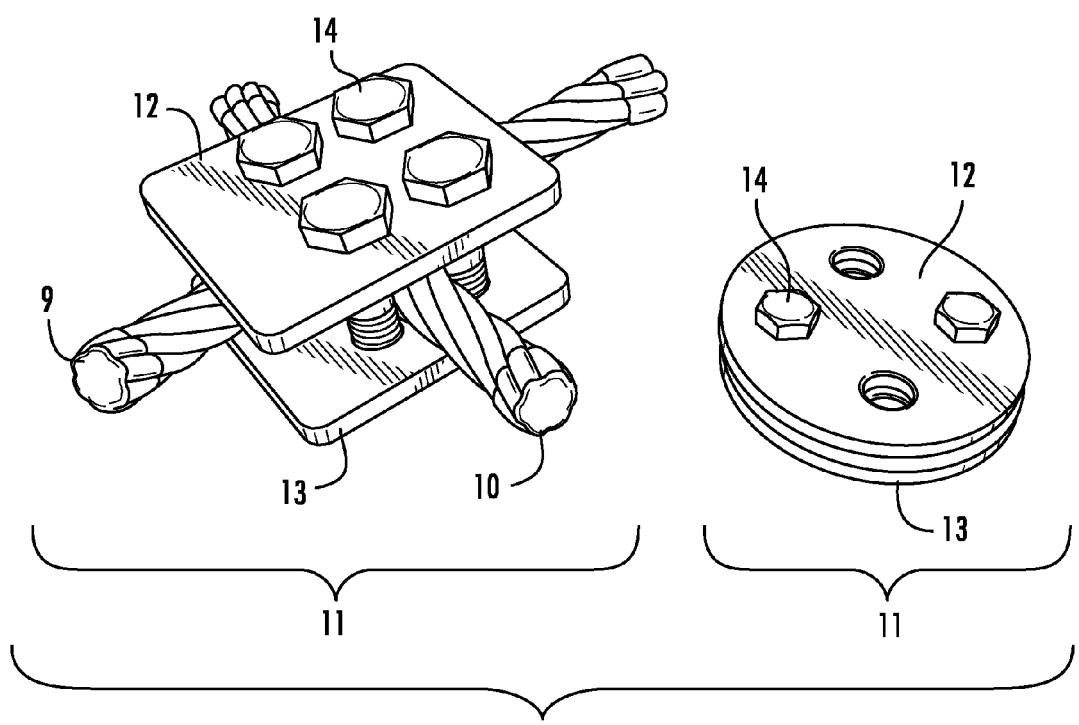
Figure 6B:
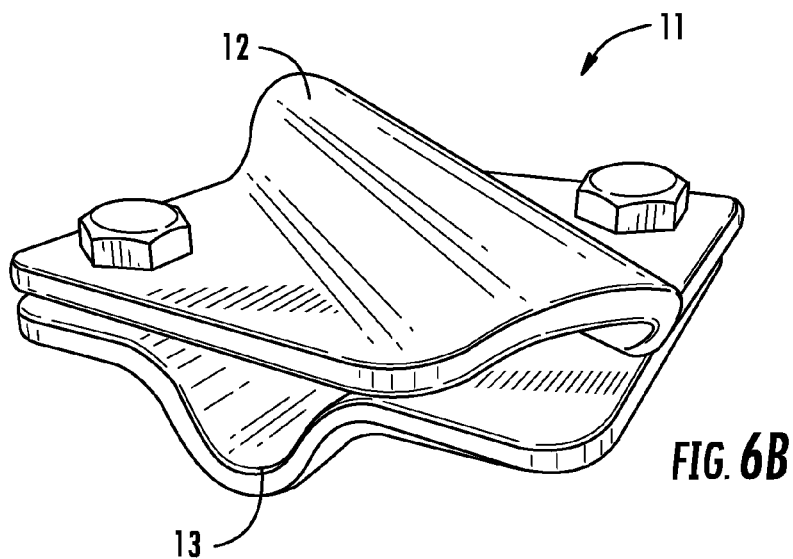
Figure 7A:
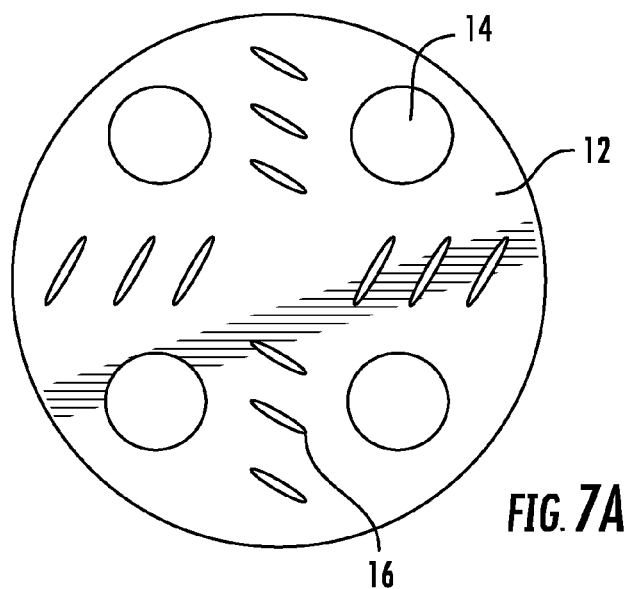
Figure 7B:
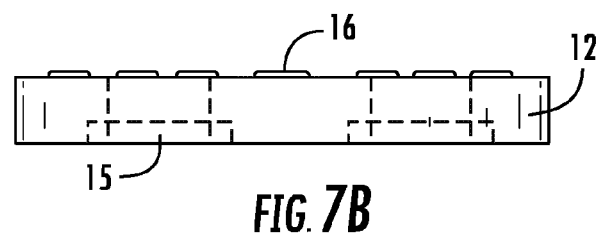
Figure 8A:
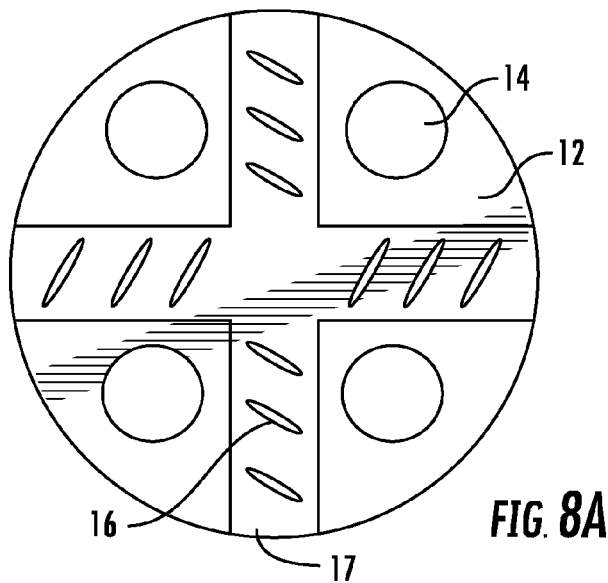
Figure 8B:
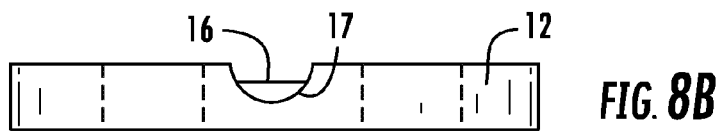
Figure 9A:
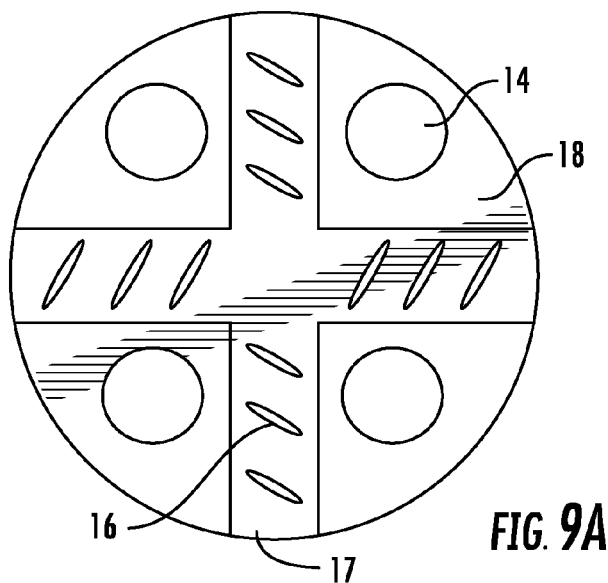
Figure 9B:
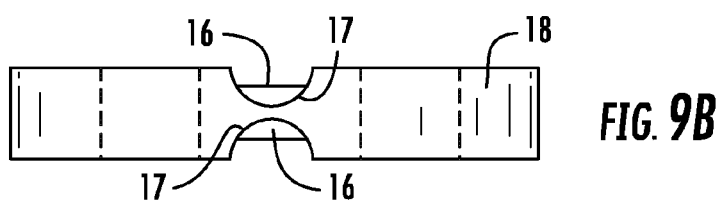
Figure 10:
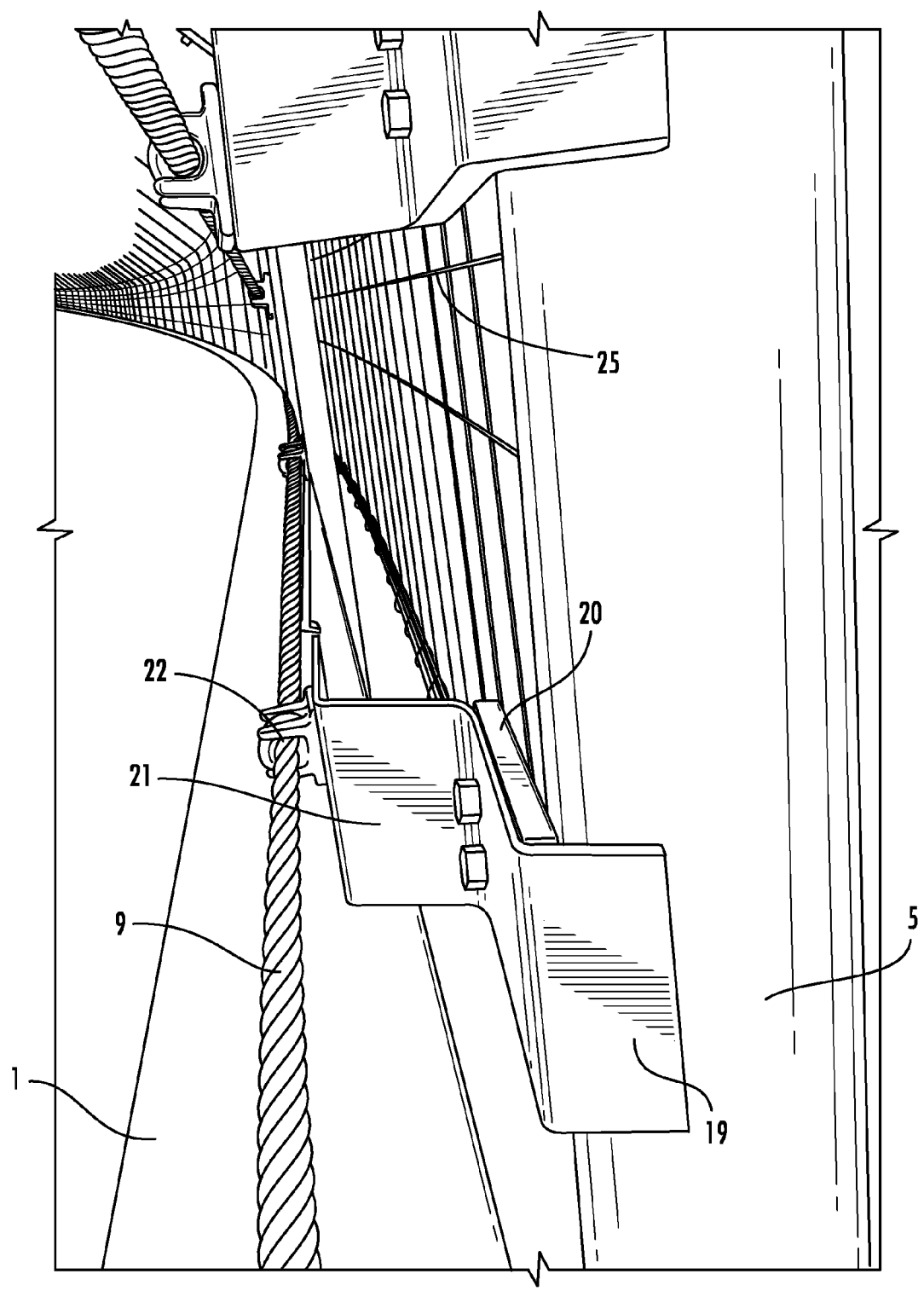
Figure 11:
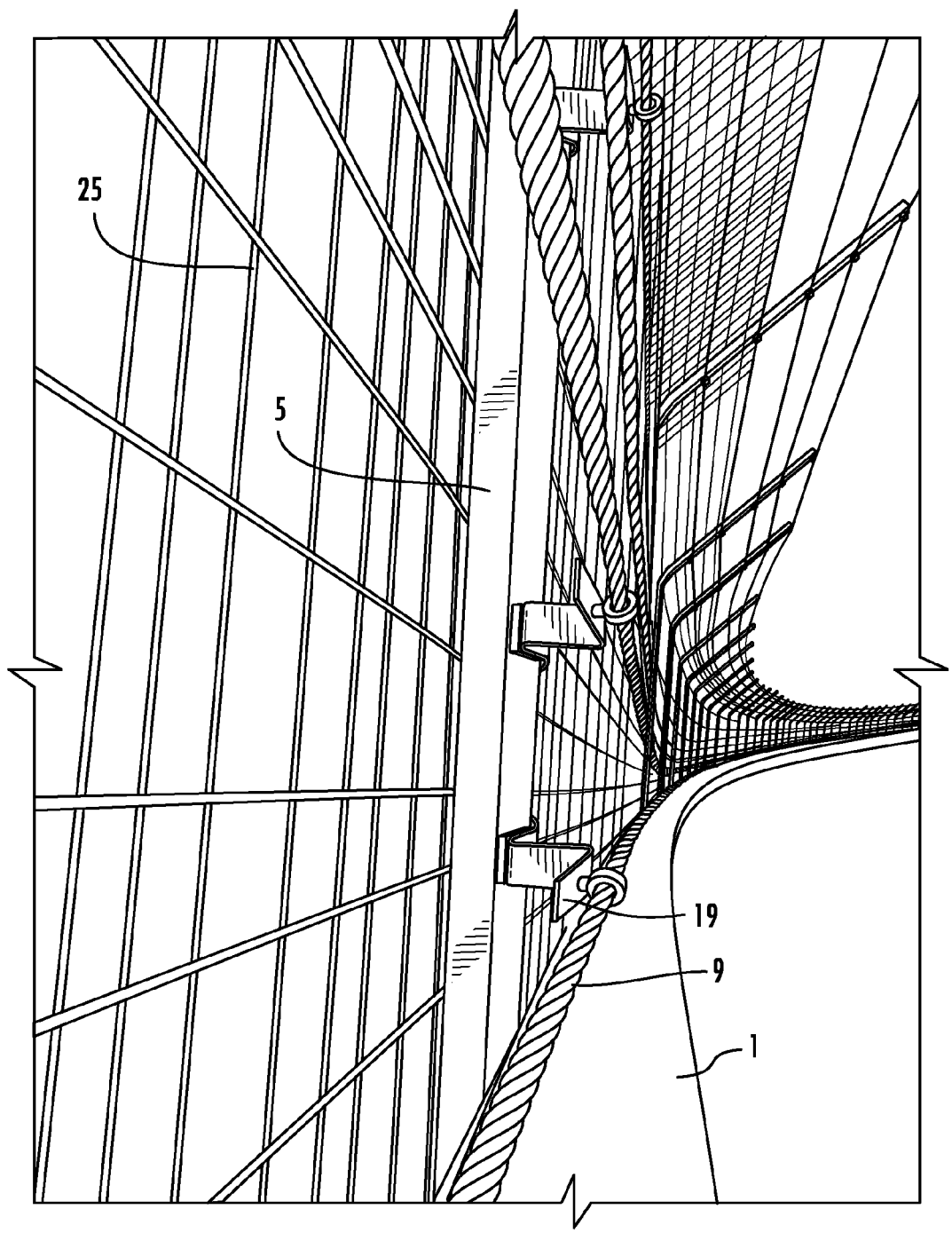
Figure 12A:
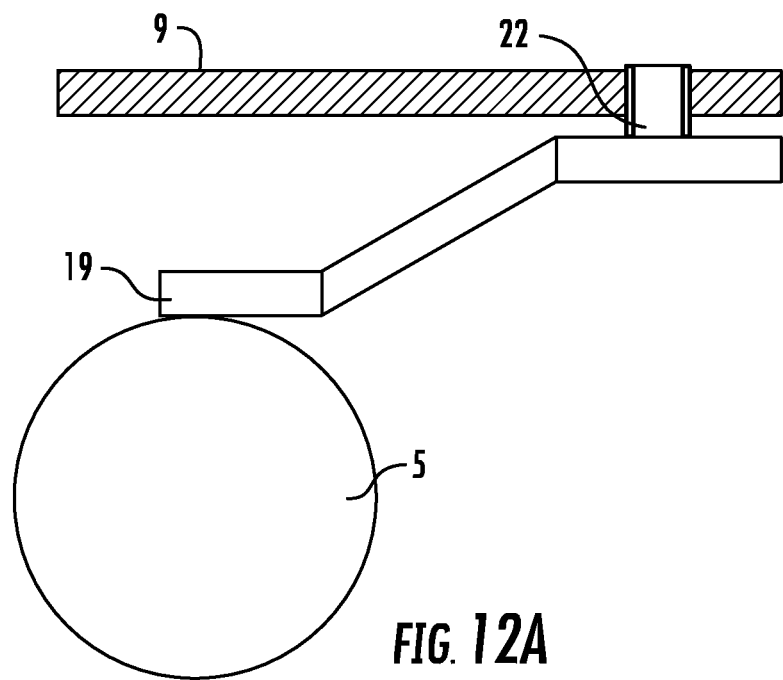
Figure 12B:
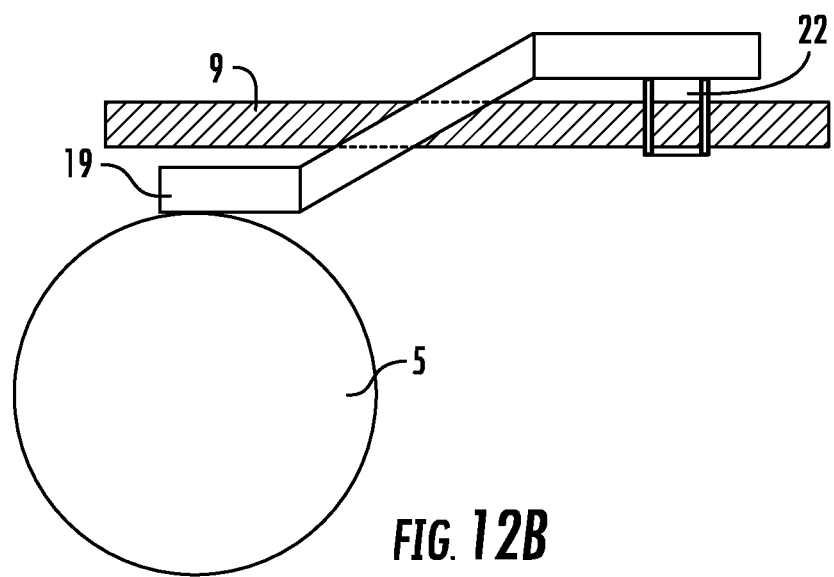
Figure 13A:
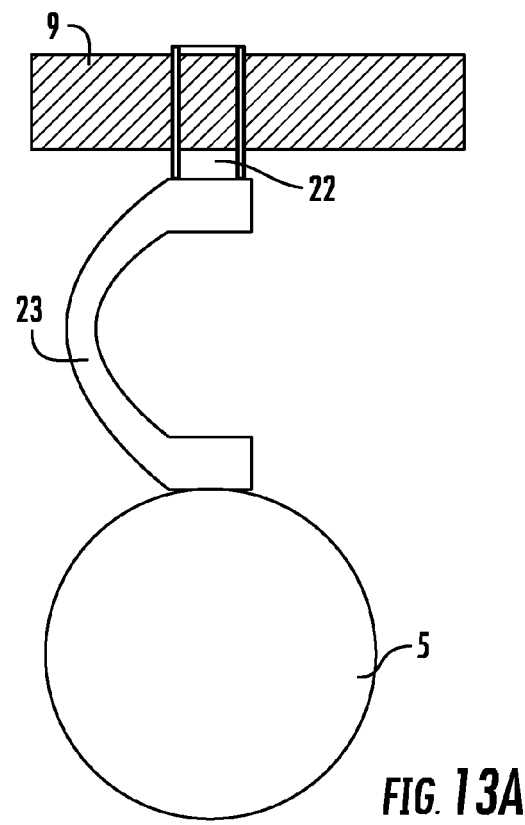
Figure 13B:
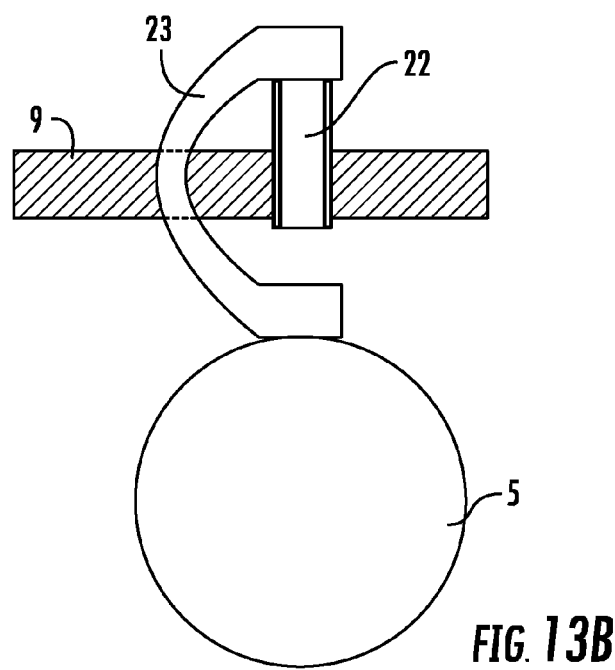
Figure 14A:
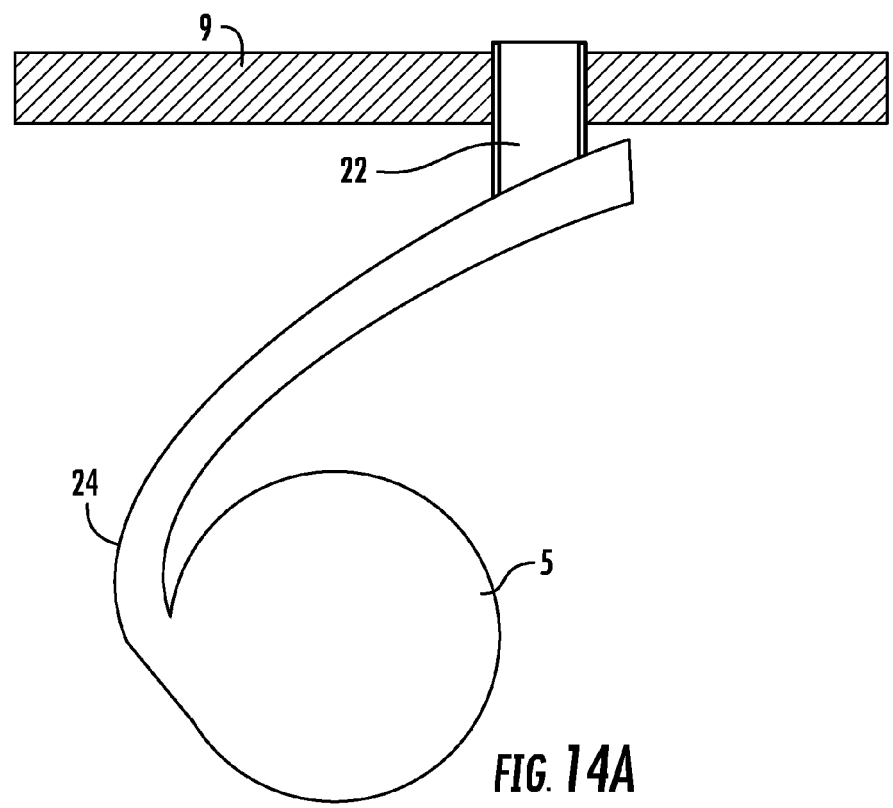
Figure 14B:
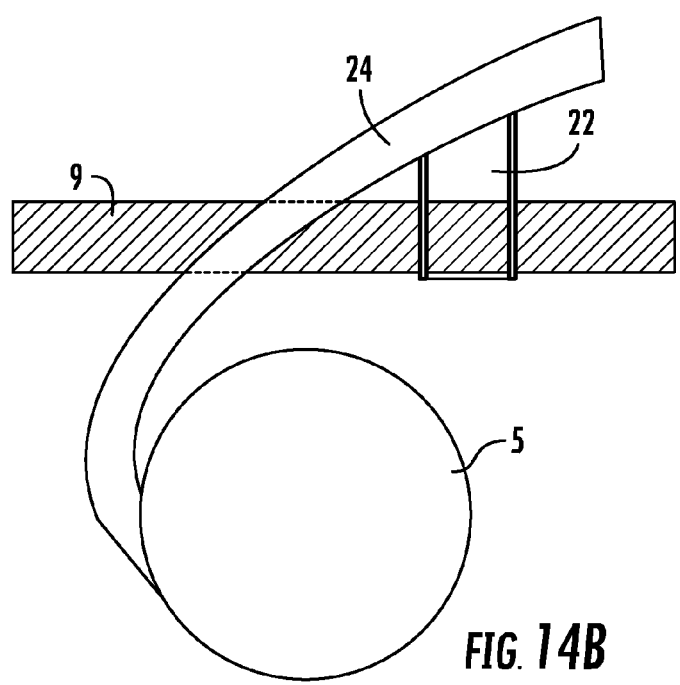
Figure 15A:
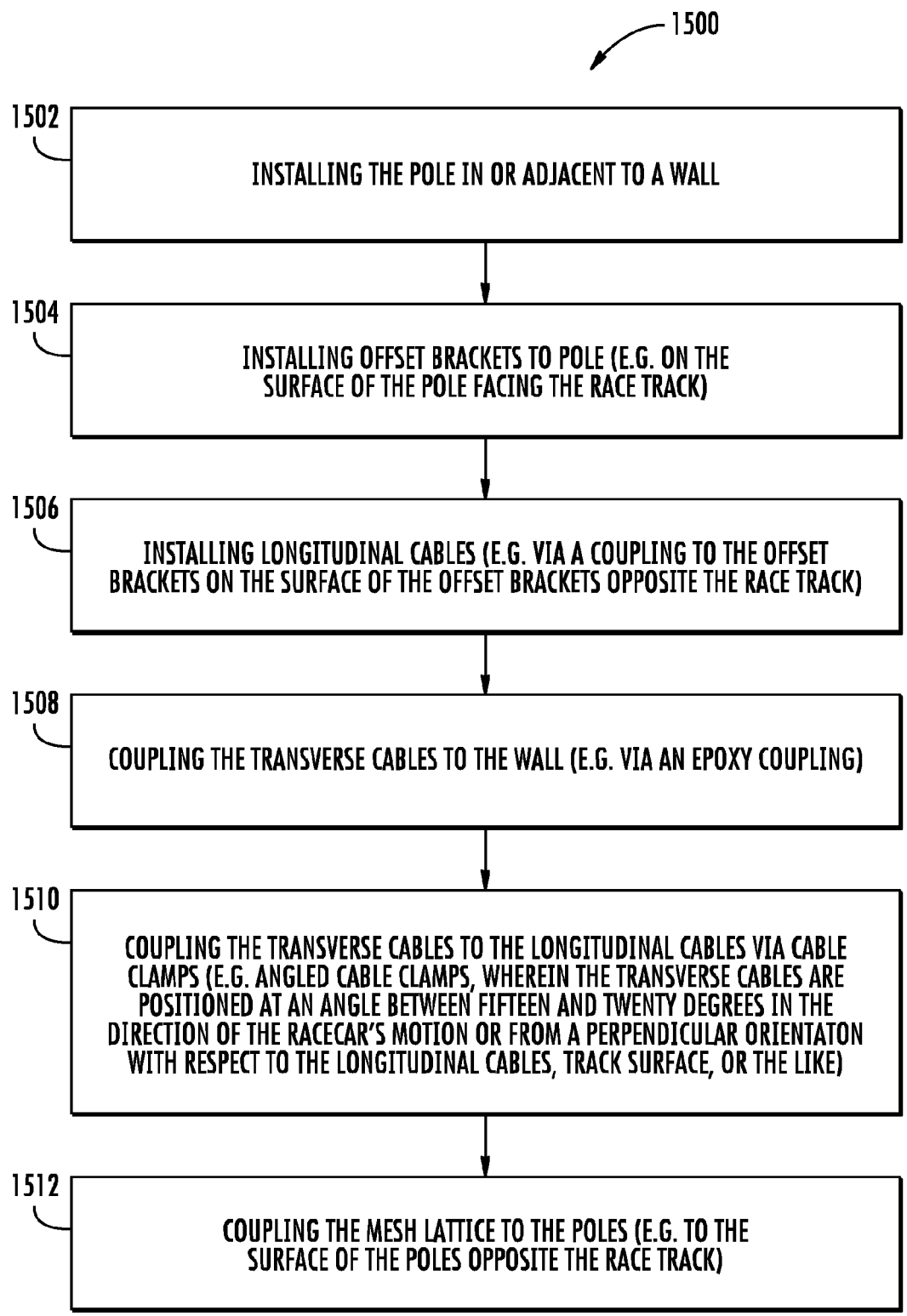

Having thus described embodiments of the invention in general terms, reference will now be made to the accompanying drawings, where:

FIG. 1 illustrates a wall along a race track, in accordance with one embodiment of the invention;

FIG. 2A illustrates a wall with a catch fence having a vertical transverse cable, in accordance with one embodiment of the invention;

FIG. 2B illustrates a wall with a catch fence having an angled transverse cable, in accordance with one embodiment of the invention;

FIG. 2C illustrates a catch fence having an angled cable clamp, in accordance with one embodiment of the invention;

FIG. 3 illustrates a cable clamp, in accordance with one embodiment of the invention;

FIG. 4 illustrates one embodiment of a cable clamp, in accordance with one embodiment of the invention;

FIG. 5A illustrates one embodiment of the inside surface of a cable clamp with ridges and formed to secure cables, in accordance with one embodiment of the invention;

FIG. 5B illustrates one embodiment of the side of a cable clamp with ridges and formed to secure cables, in accordance with one embodiment of the invention;

FIG. 6A illustrates a perspective view of a cable clamp, in accordance with one embodiment of the invention;

FIG. 6B illustrates a perspective view of an angled cable clamp, in accordance with one embodiment of the invention;

FIG. 7A illustrates one embodiment of the inside surface of a cable clamp with ridges, in accordance with one embodiment of the invention;

FIG. 7B illustrates one embodiment of the side of a cable clamp with ridges, in accordance with one embodiment of the invention;

FIG. 8A illustrates one embodiment of the inside surface of a cable clamp with a channel and ridges, in accordance with one embodiment of the invention;

FIG. 8B illustrates one embodiment of the side of a cable clamp with a channel and ridges, in accordance with one embodiment of the invention;

FIG. 9A illustrates one embodiment of a face surface of a spacer, in accordance with one embodiment of the invention;

FIG. 9B illustrates one embodiment of the side of a spacer, in accordance with one embodiment of the invention;

FIG. 10 illustrates a perspective view of an offset bracket with two sections, in accordance with one embodiment of the invention;

FIG. 11 illustrates a perspective view of an offset bracket with two sections, in accordance with one embodiment of the invention;

FIG. 12A illustrates a cross-sectional top view of an offset bracket, in accordance with one embodiment of the invention;

FIG. 12B illustrates a cross-sectional top view of an offset bracket, in accordance with one embodiment of the invention;

FIG. 13A illustrates a cross-sectional top view of a C-shaped bracket, in accordance with one embodiment of the invention;

FIG. 13B illustrates a cross-sectional top view of a C-shaped bracket, in accordance with one embodiment of the invention;

FIG. 14A illustrates a cross-sectional top view of a spring-type bracket, in accordance with one embodiment of the invention;

FIG. 14B illustrates a cross-sectional top view of a spring-type bracket, in accordance with one embodiment of the invention; and FIG. 15A illustrates a process flow describing how the components of the safety catch fence may be installed, in accordance with one embodiment of the invention.

Figure 15B:
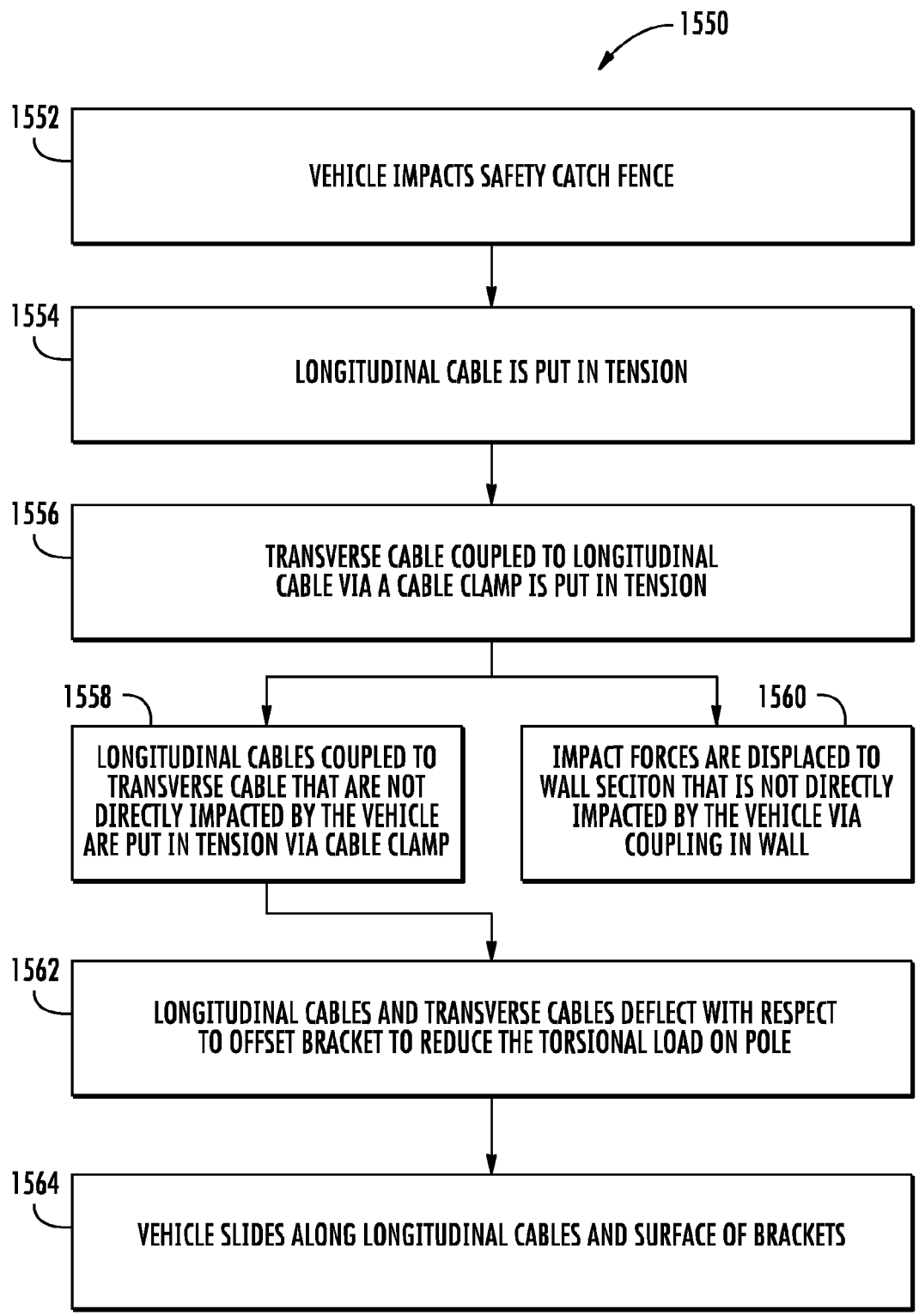

FIG. 15B illustrates a process flow describing how the components of the safety catch fence dissipate loads upon impact of a vehicle, in accordance with one embodiment of the invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

As used herein, the term "vehicle" may refer to any type of vehicle, including but not limited to a car, truck, racecar, dragster, dune buggy, four-wheeler, cart, boat, motorcycle, recreational vehicle, aircraft, snow mobile or other like vehicle that may be traveling on a race track or other type of road, including but not limited to a highway, an expressway, a through road, or another like road. These terms may be substituted for each other and used interchangeably throughout.

In some embodiments, a wall 1 may exist on the outer edge of a race track (e.g., a banked racing surface, a road course, or the like), as displayed in FIGS. 1, 2A, 2B, 3, 10, and 11. The wall 1 may serve as a barrier between the race track and a surrounding area, which may include but is not limited to a grandstand of spectators, a walkway, a parking lot, a natural area, or the like. The purpose of the wall 1 is to retain a vehicle inside the designated racing area while protecting the surrounding area from debris during a collision with the wall 1.

In some high-speed racing applications, the vehicle may collide with the wall 1. To ensure the safety of the operator of the vehicle, the race track may be separated from the area surrounding the outer edge of the track, or any spectators or bystanders beyond the outside edge of the race track by a wall 1 that is made from a durable material, such as concrete, cement, steel, or the like. Typically, the wall 1 is solid and immovable.

As displayed in FIG. 1, the wall 1 may include a second wall that is coupled to the inner surface of the wall 1 (e.g., the surface closest to the race track) via a coupling. The coupling may be collapsible as to prevent the racecar from colliding with the wall 1 or reduce the force of the collision between the racecar and the wall 1 before impact with the wall 1. Typically, a spectator's field of vision of the race track is a high priority. So, the wall 1 may be constructed to reach a predetermined height as to not obstruct the spectators' fields of vision. However, additional protection is often needed to protect the spectators from debris or in the event that a vehicle becomes airborne or otherwise extends over the top of the wall 1.

A catch fence 4 may be constructed on top of or adjacent to the wall 1 to provide additional security, as is displayed in FIGS. 2A and 2B. The catch fence 4 may include a series of vertical poles, protective cabling, and wire mesh that increases the safety the race without obstructing the spectator's view. The purpose of the catch fence 4 may be to provide a sliding surface for the colliding vehicle, and to minimize the amount of shearing or damage done to the vehicle upon impact with the wall 1 or catch fence 4. A sliding surface for the colliding vehicle allows the force of the vehicle to be dissipated gradually as opposed to a hard surface that would cause more damage upon impact. Furthermore, the more static surfaces along the sliding surface the more damage may be done to the vehicle or catch fence 4, which could lead to more debris during the collision. The catch fence 4 helps to redistribute and/or transfer the potentially destructive forces of the vehicle in a more efficient and safe manner.

The catch fence 4 may have two or more poles 5 made of steel, composite, or other like material that create a frame for the safety catch fence 4, and are depicted in FIGS. 2A and 2B, and FIGS. 10 through 14B. In some embodiments, the pole 5 may be coupled to the wall 1 via a recessed aperture in the wall 1 into which the pole 5 is set. The pole 5 may be affixed to the wall 1 using cement, concrete, epoxy, or other like material. In other embodiments, the pole 5 may be freestanding and have no coupling with the wall 1, but rather a coupling with the ground. In still other embodiments of the invention, the pole 5 may be coupled to the side of the wall 1 opposite the race track, using a mechanical fastener, such as a u-clamp or other like fastener. The freestanding pole 5 may be positioned outside of the wall 1 so that the wall 1 is between the race track and the pole 5. In other embodiments one or more of these may be used to secure the pole 5 at or near the wall 1. The size of the poles 5 may define a width, a height, or a thickness of the catch fence 4. Typically, the poles 5 are spaced between ten and twenty feet apart from each other.

In some embodiments, the pole 5 may be positioned in a generally upright position that is perpendicular with the ground, or at an angle with respect to the ground. Therefore, in some embodiments the pole 5 may hang over at least a portion of the wall 1 or the race track. In other embodiments, the pole 5 may comprise a generally upright section 7 and an overhang section 8, which allows the catch fence 4 to overhang the race track, as depicted in FIGS. 2A and 2B. The overhang section 8 may be angled at a predetermined height and angle so as to comply with desired requirements.

Two or more longitudinal cables 9 may run along the length of the race track as shown in FIGS. 2A, 2B, 3, 10, and 11. In some embodiments, each single longitudinal cable 9 may run horizontally so that the longitudinal cable 9 is generally parallel to the race track surface and to the other longitudinal cables 9. The purpose of longitudinal cables 9 are to provide a smooth sliding surface in the direction of the vehicle's motion for when the vehicle collides with the wall 1 and catch fence 4. This may ultimately minimize damage to the vehicle upon impact.

In some embodiments, a number of longitudinal cables 9 may be used in a spaced apart, parallel configuration to create a set of longitudinal cables. The set of longitudinal cables may be positioned above one another in order to create a set of longitudinal cables 9 that extend at least partially upwards on the upright section 7. In other embodiments, the set of longitudinal cables 9 may fully extend upwards on the upright section 7. In alternative embodiments, the set of longitudinal cables 9 may fully extend upwards on the upright section 7 and extend partially or fully on the overhang section 8.

A transverse cable 10 may be operatively coupled to the two or more longitudinal cables 9 as displayed in FIGS. 2A, 2B, 2C, 3, 4, 6A and 6B. The addition of a transverse cable 10 may help to maintain the two or more longitudinal cables 9 in their respective positions upon impact. Furthermore, the transverse cable 10 may help diffuse impact forces from the vehicle and transfer the impact forces throughout the catch fence 4 system in a safer and more efficient manner. As described in further detail later, upon impact from the vehicle both the longitudinal cables 9 and the transverse cable 10 are placed in tension, and thus absorb the load from the impacting vehicle. Furthermore, the transverse cable 10 may also distribute the load of the racecar to other longitudinal cables 9 that are not specifically impacted by the vehicle because the two or more of the longitudinal cables 9 are operatively coupled to each other through the transverse cable 10. Thus, the damage sustained during a collision between the vehicle and the wall 1 and catch fence 4 may be minimized. In the illustrated embodiments the longitudinal cables 9 and traverse cable 10 are positioned between the poles 5 and the race track. This configuration is depicted in FIGS. 3, 10 and 11.

In some embodiments, the transverse cable 10 may be coupled to the two or more longitudinal cables 9 in a generally upwards position (e.g., vertically or generally vertically), as shown in FIGS. 2A, 3, 4, and 6A. In other embodiments, the transverse cable 10 may be coupled to the two or more longitudinal cables 9 at a predetermined angle as depicted in FIGS. 2B, 2C, and 6B. For example, slanting the transverse cable 10 at an angle between fifteen and twenty degrees (or other angles outside of this range) along the direction of the vehicle's motion (e.g., downstream to upstream) may provide a more optimized redistribution of impact forces during a collision. In some embodiments of the invention the transverse cable 10 may be positioned at an angle of 5, 10, 15, 20, 25, 30, 35, 40, 45, 50, 55, 60, 65, 70, 75, 80, 85 degrees, or the like, or any range in-between one or more of these angles, from a vertical position (e.g., perpendicular) of a transverse cable 10 with respect to the longitudinal cables 9, wall 1, surface of the track, or other like surface. As illustrated in FIG. 2B, the transverse cable 10 may be positioned on a side of a mesh lattice 25 opposite the race track so that the mesh lattice 25 is positioned between the network of the transverse cables 10 and the longitudinal cables 9 and the race track. However, in other embodiments, the transverse cable 10 may be positioned on a side of the mesh lattice 25 facing the rack track so that the network of the transverse cables 10 and the longitudinal cables 9 is positioned between the mesh lattice 25 and the race track as depicted in FIGS. 2A, 3, 10, and 11. When the transverse cable 10 is operatively coupled to the longitudinal cables 9 it may be beneficial to ensure that the cable is substantially straight by providing the same angle in the cable clamp 11 (e.g., angled channel 17) as the angle at which the transverse cable 10 will be coupled to the one or more longitudinal cables 11. Therefore, as illustrated in FIGS. 2C and 6B the cable clamp 11 may have an angled channel to operatively couple the transverse cable 10 with respect to the longitudinal cables 9, as described in further detail later. FIG. 2C further illustrates that the transverse cable 10 may be positioned at a downward angle in relation to the direction of the oncoming vehicle (e.g., the transverse cable 10 slopes downwardly from a coupling with a top longitudinal cable 9 to a bottom longitudinal cable 9 in relation to the direction of the oncoming vehicle). In other embodiments, the transverse cable 10 may be positioned at an upward angle in relation to the direction of the oncoming vehicle (e.g., the transverse cable 10 slopes upwardly from a coupling with a bottom longitudinal cable 9 to a top longitudinal cable 9 in relation to the direction of the oncoming vehicle) as shown in FIG. 2B.

The transverse cable 10 may also be coupled to the wall 1 via a coupling 6 to provide additional support and load distribution upon the impact of the vehicle. A hole may be drilled into the wall 1 large enough into which the transverse cable 10 may be embedded with an epoxy (as shown in FIG. 3), cement, concrete, or other like attachment material. In other embodiments, the transverse cable 10 may be mechanically attached to the wall 1. In other embodiments of the invention instead of being attached to the wall 1, the transverse cable 10 may be operatively coupled to the outside surface of the wall 1, the ground, the pole 5, or other location on the catch fence 4, area around the catch fence 4, or structure near the catch fence 4. In the illustrated embodiment the longitudinal cables 9 are positioned on the side of the poles 5 facing the race track and the transverse cable 10 is positioned on the side of the longitudinal cables 9 opposite the race track, as depicted in FIG. 3. In this configuration, the longitudinal cable 9 provides a sliding surface along which the colliding racecar may slide upon impact without contacting static support locations (e.g., transverse cable 10, poles 5, etc.). The transverse cable 10 is located behind the longitudinal cables 9 in order to provide support in redistributing the impact forces during the collision without providing a break in the sliding surfaces of the longitudinal cables 9. In other embodiments of the invention, the transverse cable 10 may be positioned on the side of the longitudinal cables 9 facing the race track. In alternative embodiments of the invention, the transverse cable 10 may be woven through the longitudinal cables 9, such that the transverse cable 10 may be located on the side of one or more longitudinal cables 10 facing the race track and the side of one or more other longitudinal cables 10 opposite the race track.

In one embodiment, the longitudinal cable 9 and the transverse cable 10 are constructed from ⅝-inch steel cable. Alternatively, in other embodiments of the invention the cables may be different sizes and made from different materials not explicitly described herein.

Referring now to FIGS. 3 through 8B, the transverse cable 10 may be operatively coupled to the longitudinal cable 9 via a cable clamp 11. The cable clamp 11 may define a first plate 12 and a second plate 13. The first plate 12 may rest on the longitudinal cable 9 on the side facing the race track while the second plate 13 may rest on the transverse cable 10 on the side opposite the race track, as depicted in FIGS. 3 and 4. In other embodiments, this configuration may be reversed depending on the desired configuration of the longitudinal cables 9 and the traverse cable 10. In some embodiments the first plate 12 and second plate 13 may be contoured to fit around the longitudinal cable 9 and the transverse cable 10, as illustrated in FIGS. 4, 5A, and 5B. In other embodiments, the first plate 12 and second plate 13 may be spaced apart from each other, as illustrated in FIG. 6A. FIGS. 3 and 4 also illustrate that the first plate 12 and the second plate 13 may be coupled together via non-permanent couplings 14 such as screws, bolts, pins, or the like. Typically, the couplings are shear-strength bolts forged from 50 ksi (50,000 pounds per square inch) or higher "Grade-A" steel. In some embodiments, the couplings 14 may be recessed into a cavity or countersink 15 in either the first plate 12 or the second plate 13 so as to create a smooth outer sliding surface for the potentially colliding racecar, as illustrated in FIG. 7B. The cable clamp 11 (e.g., first plate 12 and second plate 13) may include rounded edges to minimize the number of sharp surfaces, as seen in FIG. 5, which may potentially inflict damage on the colliding vehicle. The first plate 12 or the second plate 13 may be formed from flat plates, bent, stamped, or the like.

In some embodiments (and as seen in FIGS. 5A, 5B, 7A, 7B, 8A, and 8B), the first plate 12 and the second plate 13 may include ridges 16 (e.g., stamped, welded, casted, machined, or the like) on their inside surfaces (e.g., the surfaces that are in contact with at least one of the longitudinal cable 9 or the transverse cable 10) to "bite," or clamp down on the longitudinal cable 9 or the transverse cable 10. The ridges 16 may be formed such that they align with grooves or spaces in the cables 9, 10. The ridges 16 may be positioned in either one direction along the first plate 12 or the second plate 13 (as shown in FIG. 5A and 5B) or a combination of directions along the first plate 12 and the second plate 13, as shown in FIGS. 7A through 8B. The ridges 16 may be angled so as to complement the angled twist of the space between individual strands of the cable so as to fit between adjacent strands.

In some embodiments, the first plate 12 and the second plate 13 may include a channel 17 on their inside surfaces to create cavities into which the longitudinal cable 9 or the transverse cable 10 may securely rest, as depicted in FIGS. 4, 5A, 5B, 8A, and 8B. The channel 17 may be formed by molding, bending, stamping, machining (e.g., cutting), or the like the first plate 12 or second plate 13. In some embodiments of the invention the ridges 16 may only be formed in either the first plate 12 or the second plate 13. The ridges 16 may be formed in different locations and orientations on the first plate 12 or second plate 13. In still other embodiments of the invention the cable clamp 11 may only have a first plate 12 and is secured to the longitudinal cables 9 or transverse cables 10 using u-clamps or other like attachment mechanism.

Furthermore, as illustrated by FIG. 6B, in some embodiments a channel 17, ridges 16, or other feature that helps to secures the transverse cable 10 to the longitudinal cable 9 may be positioned at an angle in order operatively couple the transverse cable 10 to the longitudinal cable 9 at the desired angle. For example, if the transverse cable 10 is positioned at 15 to 20 degrees from the longitudinal cables 9, the ground, the surface of the race track, or other like surface, the channel 17 or other securing feature of the cable clamp 11 may also be positioned at approximately 15 to 20 degrees within the cable clamp 11. As illustrated in FIGS. 2C and 6B, the cable clamp 11 may be in the general shape of a square with two bolts (e.g., instead of four), that reduces the number edges that could cut, tear, puncture, or otherwise damage a car upon impact. In other embodiments of the invention, the generally square shaped cable clamp 11 may be another type of shape described herein, and further may be in the general shape parallelogram, oval, trapezoid or other like shape. The other cable clamps 11 described herein may also have one of these types of shapes.

In alternative embodiments, a spacer 18 (metallic, plastic, or otherwise) may be positioned between the longitudinal cable 9 and the transverse cable 10 to improve the operative coupling between the longitudinal cable 9 and the transverse cable 10. Therefore, in some embodiments the cable clamp 11 may have three plates, that is a first plate 12, a second plate 13, and a spacer 18. One embodiment of the invention of the spacer 18 is depicted in FIGS. 9A and 9B. In other embodiments of the invention, the spacer 18 may have ridges 16 and/or a channel 17 in one direction, or in two directions (as illustrated in FIGS. 9A and 9B), on both sides of the spacer 18.

The catch fence 4 may also comprise offset brackets 19 that are operatively coupled to the poles 5. The offset brackets 19 may be operatively coupled to the poles 5 via welding, bolting, or other like attachment and are used to hold the longitudinal cables 9 in place. The multiple offset brackets 19 may be spaced along the upright section 7 or the overhang section 8 of the pole 5 to a desired spacing between the two or more longitudinal cables 9, as seen in FIGS. 2A, 2B, 10, and 11. In some embodiments, the thickness of the offset bracket 19 may match the wall thickness of the pole 5 to maximize the strength of the system. In other embodiments, the thickness of the offset bracket 19 may be less than that of the poles 5, such that upon impact by a vehicle the offset bracket 19 may fail before the poles 5 fail. In some embodiments, the offset bracket 19 may be manufactured from ⅜₃₆-inch steel.

In some embodiments, the offset bracket 19 may include two sections, for example, a base section 20, and an offset section 21. An embodiment of this configuration is illustrated in FIGS. 10 and 11. The base section 20 may be permanently coupled to the side facing the race track of the pole 5 via a weld or similar coupling. Thus, the offset bracket 19 may be positioned between the network of longitudinal cables 9 and transverse cables 10 and the pole 5. The offset section 21 may be permanently coupled (e.g., through a weld, or the like) or detachably coupled (e.g., through bolts, or the like) to the base section 20. Further, the offset section 21 may position the network of longitudinal cables 9 and traverse cables 9 a predetermined distance away from the poles 5. The offset section 21 typically produces an offset of three to six inches. In some embodiments of the invention this distance allows the cables 9, 10 to deflect upon impact and reduce impact on the poles 5. This offset may also allow for the offset bracket 19 to rotationally flex or be displaced with respect to the pole 5 upon impact. For example, when the vehicle collides with the catch fence 4 and impacts the cables 9, 10 and/or offset bracket 19, the offset section 21 may flex with the force of the vehicle and may redirect the potentially destructive rotational forces from the pole 5 to the longitudinal cable 9 (and thus the transverse cable 10 and the wall 1). If the offset section 21 detaches from the pole 5, a new offset section 21 may be attached to the base section 20. Hence, the two-section configuration of the offset bracket 19 may provide a quick fix to ensure the safe continuation of the race and operation of the catch fence 4 for the remainder of the race. In other embodiments of the invention the desired offset of the cables 9, 10 from the poles 5 may be outside of the range of three to six inches. In particular, any offset could be selected that would provide desired separation between the cables and poles to reduce potential for impact of the vehicle with the poles.

The longitudinal cable 9 may be coupled to the offset section 21 of the offset bracket 19 using a coupling 22, such as a hook, a stud, a pin, shear-strength bolts, or the like, as shown in FIGS. 10 through 14B. In some embodiments, the longitudinal cable 9 may be coupled to the side of the offset section 21 facing the race track as depicted in FIGS. 10, 11, 12A, 13A, and 14A. In this embodiment the coupling 22 may provide a surface that could damage the vehicle and create additional debris on impact of the vehicle with the catch fence 4. In other embodiments, the longitudinal cable 9 may be coupled to the side of the offset section 21 opposite the race track as depicted in FIGS. 12B, 13B, and 14B, such that the longitudinal cable 9 is located between a portion of the bracket 16 and the pole 5. This configuration may include a hole in the offset bracket 19 through which the longitudinal cable 9 may run. This configuration may provide the sliding surface with fewer surfaces that could damage the vehicle and create more debris. A smooth side of the offset bracket 19 facing the race track may prevent additional damage to the vehicle upon impact and during the subsequent sliding of the vehicle along the catch fence 4. Both configurations of the coupling 22 on the side facing the race track and the coupling 22 on the side opposite the race track may utilize recessed couplings to operatively couple the longitudinal cables 9 to the offset bracket 19 to reduce the number of additional surfaces that could damage the vehicle on impact.

In other embodiments, the offset bracket 19 may comprise a single section while maintaining the same functionality as the two-section bracket 19 discussed above. FIGS. 12A and 12B illustrate single-section offset bracket 19 designs.

Other types of single-section bracket designs may be implemented. For example, a unitary C-shape bracket 23 may be formed as depicted in FIGS. 13A and 13B. The C-shape bracket 23 may be positioned so the "C" flexes in on itself in the direction of the motion of the racecar upon impact. The C-shape bracket 23 may also include a hole as to allow the longitudinal cable 9 to pass through, as depicted in FIG. 13B. The C-shaped bracket 23 is typically installed on the pole 5, such that the open portion of the C is opposite from the direction of travel of the vehicle to so that the opening does not "catch" or "snag" the vehicle as it impacts the catch fence.

Another example of a single-section bracket design, shown in FIGS. 14A and 14B, may be a spring-type bracket 24 wherein the spring-type bracket 24 is spring loaded (e.g., a leaf spring) and is curved along the direction of the motion of the racecar. The spring-type bracket 24 may also include a hole as to allow the longitudinal cable 9 to pass through, as depicted in FIG. 14B. All of the different embodiment of brackets 19 may include rounded edges to minimize the potential shearing of a colliding racecar. In other embodiments the single-section brackets illustrated in FIGS. 12A-14B may be made up of one or more sections that allow the sections of the brackets to be replaced if they are damaged during a collision.

The catch fence 4 may also include a mesh lattice 25 as an outermost layer of defense. The mesh lattice 25 may comprise a wire mesh that is constructed from welded wire, and the wire mesh lattice 25 may resemble a grid of metal wires as displayed in FIGS. 2A, 2B, 2C, 3, 10, and 11. The mesh lattice 25 may include a set of wires that run longitudinally and a set of wires that run transversely thereto as seen in FIGS. 2A, 2B, 2C, 3, 10, and 11. The wire may or may not be woven. In other embodiments, the wire mesh may be a chain-link fence or other like fence. In some embodiments, the mesh lattice 25 may be permanently coupled to the pole 5 via a weld, epoxy, cement, concrete, or the like, or detectably coupled using fasteners, hooks, clips, pins, or other like couplings. In other embodiments, the mesh lattice 25 may be permanently or detachably coupled to the wall 1 in a similar manner as described with respect to the pole 5. In other embodiments, the mesh lattice 25 may be permanently or detachably affixed in the ground beyond the outer surface of the wall 1 (e.g., the surface furthest from the race track and closest to the surrounding area, grandstand, or the like) in a similar manner as described with respect to the pole 5 or the wall 1.

The mesh lattice 25 may be positioned on the side of the poles 5 facing the track or on the side of the poles 5 opposite the race track. Positioning the mesh lattice 25 on the side of the poles 5 opposite the race track may provide a fencing system with less destruction to the vehicle and less creation of debris, as well as maintaining the integrity of the mesh lattice 25 to capture debris. In some instances, the longitudinal cabling 9 may prevent the vehicle from contacting the mesh lattice 25 or reduce the amount of contact. The less damage the mesh lattice 25 incurs from the impact the more reliable it may be in catching debris from the vehicle and/or other components of the catch fence 4.

Referring now to FIG. 15A, the present invention may include a method 1500 for installing the vehicle safety catch fence 4. At block 1502, the method includes installing a plurality of poles 5 o or adjacent to the wall 1 using cement, concrete, a clamp, a bracket, or other like similar coupling means. The poles 5 may include a substantially vertical section 7 and an angled overhang section 8 that extends partially over the race track. The method further includes installing a plurality of offset brackets 19 to the poles 5 wherein the offset brackets 19 are coupled to the poles 5 on the surface facing the race track so that the offset brackets 19 may flex around the pole 5 during a collision with a racecar, as described at block 1504. At block 1506, the method includes installing a plurality of longitudinal cables 9 through a hole in the offset brackets 19 via a coupling 22 so that the longitudinal cables 9 are installed on the surface of the offset brackets 19 facing the race track. At block 1508, the method includes installing a plurality of transverse cables 10, wherein the transverse cables 10 are coupled to the wall 1, for example via an epoxy 6 or another type of coupling. At block 1510, the method includes coupling the transverse cables 10 to the longitudinal cables 9 in a in a perpendicular orientation, or at an angled orientation using cable clamps 11. For example, angled cable clamps 11 may be utilized so that the transverse cables 10 can be positioned at an angle between fifteen and twenty degrees (or at another angle) in the direction of the racecar's motion. Furthermore, the transverse cables 10 may be positioned on the surface of the longitudinal cables 9 facing the race track. At block 1512, the method includes installing the mesh lattice 25 to the poles 5, wherein the mesh lattice 25 is positioned on the surface of the poles 5 opposite the race track.

Transverse cables 10 may also be retrofitted onto an existing catch fence system 4. First, by securing an end of the transvers cable 10 to a wall 1 and operatively coupling the transverse cable 10 at the desired angle with respect to the longitudinal cables 9.

Referring now to FIG. 15B, the present invention may include a method 1550 for redirecting, redistributing, or transferring forces sustained during a collision. When a vehicle impacts the safety catch fence 4 at block 1552, the longitudinal cable 9 may be put in tension to displace the force of the impact as described at block 1554. Coupled to the longitudinal cable 9 is the transverse cable 10, so the transverse cable 10 may also be put in tension to displace the force of the impact, as described at block 1556. The transverse cable 10 may displace the force of the impact to the longitudinal cables 9 that are not directly impacted by the vehicle through the cable clamp 11 as mentioned at block 1558. Further, block 1560 shows the transverse cable 10 may displace the force of the impact to the wall sections 1 that are not directly impacted by the racecar via the coupling 6 in the wall 1. Block 1562 illustrates that the longitudinal cables 9 and transverse cables 10 may deflect with respect to the offset (or other style of) brackets 19 to reduce the torsional load on the poles 5. The vehicle may slide along the longitudinal cables 9 and the surface of the brackets 19 to dissipate the force of the impact, as described at block 1564.

In embodiments of the invention, various components of the present invention may be utilized to fix, repair, and/or reinforce the catch fence 4 after it is impacted by car. For example, as previously discussed, the single-section brackets or a section of the two-section brackets may be replaceable after being damaged. Moreover, should a transverse cable 10 require replacement, a new hole 6 may be drilled into a wall 1, the end of a transverse cable 10 may be placed in the wall 1, and epoxy may be utilized to couple the transverse cable 10 to the wall 1.

Also, two or more transverse cables 10 may be installed to provide a quick repair to the catch fence 4 in the event of a collision. For example, assume that during a race the vehicle collides with the catch fence 4 and damages at least one pole 5. Current repair techniques may require that a new pole 5 and new offset brackets 19 be installed before racing is allowed to continue, which may be quite a time-consuming repair. However, the present invention enables two or more transverse cables 10 to be installed on one or more sides of a damaged pole 5. For example, two or more transverse cables 10 may provide desired functionality as a temporary replacement for a pole 5 without the time or cost of installing a new pole 5 in-situ. This repair process is much less time-consuming and may ensure that the race continues in a timely manner. Therefore, the components of the present safety catch fence 4 not only potentially improves upon the safety of traditional catch fences, but also allows for quick repair, in order to allow racing to resume.

As has been disclosed above, in some embodiments of the invention, it is of interest to promote sliding of the vehicle along the catch fence with reduced friction and obstructions that may cut into or strip away pieces of the vehicle as it contacts the catch fence. In some embodiments of the invention, the placement of the longitudinal cables, transverse cable, poles, and mesh wire relative to each other to promote sliding of the vehicle along the catch fence. The concept is to provide little to no obstructions that can contact the vehicle. In this embodiment of the safety catch fence 4, the two or more longitudinal cables 9 may be run along the length of the race track. The longitudinal cables 9 are connected to the side of the poles 5 facing the race track and via offset brackets 19, such that the longitudinal cables 9 are spaced in front of the poles by 3 to 6 inches or more to reduce contact of the vehicle with the poles 5. To reduce contact with the transverse cable 10, the transverse cable 10 is connected to the sides of the two or more longitudinal cables 9 opposite the rack track. The transverse cable 10 is coupled to the wall 1 via an epoxy coupling 6. A mesh lattice 25 is connected to the side of the poles 5 opposite the side facing the race track. As is understood, the mesh lattice 25 includes longitudinal wires and crossing transverse wires. As the transverse wires of the mesh lattice may interfere with the vehicle if it contacts the mesh lattice, the mesh lattice is positioned such that the longitudinal wires face the race track and the transverse wires are located behind the longitudinal wires relative to the position of the race track, so that the vehicle may slide along the longitudinal wires of the mesh lattice without contacting the transverse wires of the mesh lattice.

In alternative embodiments, the present invention may be applied as highway guardrails. Currently, many miles of highway include a median to separate oncoming lanes of traffic. To further protect the drivers from head-on collisions, a guardrail cable system may be installed in the median. The guardrail cable system may include longitudinal cables or wires, upward-facing poles or posts to support the cables or wires, and a coupling in the fashion of a bolting, a welding, or the like. A transverse cable may be operatively coupled to the longitudinal cables of the guardrail cable systems. Furthermore, a wire mesh lattice may be included. In still other embodiments, the present invention may also be applied the sides of the road to separate the roadway from a steep incline, water, or the like, and thus prevent cars from running off of the road.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more."

What is claimed is:

1. A racetrack fencing system, comprising:
   two or more posts;
   two or more longitudinal cables operatively coupled between the two or more posts;
   a transverse cable, wherein the transverse cable is operatively coupled to the two or more longitudinal cables, wherein the transverse cable slopes upwardly in relation to the direction of motion of one or more vehicles;
   a plurality of offset brackets operatively coupled to the two or more posts, each of the plurality of offset brackets comprising an inner surface and an outer surface, and an aperture through the inner and outer surface, wherein the inner surface faces the two or more posts and the outer surface faces away from the two or more posts;
   a plurality of cable support seats, wherein each of said plurality of support seats are operatively coupled to the inner surface of each of the plurality of offset brackets and extend away from the inner surface and substantially toward each of the two or more posts;
   wherein each of the plurality of offset brackets and the plurality of cable support seats support each of the two or more longitudinal cables between the two or more posts at an offset distance located away from a surface of the two or more posts, and wherein a portion of each of the two or more longitudinal cables are located within the aperture of each of the plurality of offset brackets and secured within the cable support seat of each of the plurality of offset brackets, such that each of the two or more longitudinal cables are located between the inner surface of each of the plurality of offset brackets and the two or more posts at an offset distance located away from the surface of the two or more posts;
   wherein upon impact from the one or more vehicles the two or more longitudinal cables allow the one or more vehicles to slide with respect to the two or more longitudinal cables and the transverse cable that slopes upwardly in the direction of the impact from the one or more vehicles and the transverse cable reduces the separation of the longitudinal cables; and
   wherein the location of the plurality of cable support seats on the inner surface of the plurality of offset brackets prevents the plurality of cable support seats from shearing the one or more vehicles upon impact.

2. The system of claim 1, wherein the system further comprises two or more cable clamps, wherein the two or more cable clamps comprise:
   a first plate; and
   a second plate operatively coupled to the first plate.

3. The system of claim 2, wherein the first plate or the second plate comprises:
   a ridge located on an inner surface of the first plate or the second plate that conforms to a cable surface of the transverse cable or the two or more longitudinal cables, wherein the ridge is aligned with grooves or spaces in the cable surface of the transverse cable.

4. The system of claim 2, wherein the first plate and the second are operatively coupled through one or more bolts.

5. The system of claim 1, wherein the transverse cable comprises a first end that is operatively coupled to a wall located below the two or more longitudinal cables.

6. The system of claim 5, wherein the transverse cable is operatively coupled to the wall through an aperture in the wall with an epoxy.

7. The system of claim 1, wherein the plurality of offset brackets each comprise:
   a first bracket operatively coupled to each of the two or more posts;
   a second bracket operatively coupled to the first bracket; wherein the second bracket is offset from the two or more posts; and
   wherein the second bracket is removable from the first bracket for replacement.

8. The system of claim 1, further comprising:
   a wire mesh screen;
   wherein the two or more posts comprises a first side and a second side; and
   wherein the two or more longitudinal cables are located on the first side and the wire mesh screen is located on the second side.

9. A racetrack fencing system, comprising:
   two or more posts;
   two or more longitudinal cables operatively coupled between the two or more posts;
   a plurality of offset brackets operatively coupled to the two or more posts, each of the plurality of offset brackets comprising an inner surface and an outer surface, and an aperture through the inner and outer surface, wherein the inner surface faces the two or more posts and the outer surface faces away from the two or more posts;
   a plurality of cable support seats, wherein each of said plurality of support seats are operatively coupled to the inner surface of each of the plurality of offset brackets and extend away from the inner surface and substantially toward each of the two or more posts;
   wherein each of the plurality of offset brackets and the plurality of cable support seats support each of the two or more longitudinal cables between the two or more posts at an offset distance located away from a surface of the two or more posts, and wherein a portion of each of the two or more longitudinal cables are located within the aperture of each of the plurality of offset brackets and secured within the cable support seat of each of the plurality of offset brackets, such that each of the two or more longitudinal cables are located between an outer surface of each of the plurality of offset brackets and the two or more posts at an offset distance located away from a surface of the two or more posts;
   wherein the location of the plurality of cable support seats on the inner surface of the plurality of offset brackets prevents the plurality of cable support seats from shearing the one or more vehicles upon impact.

* * * * *